(12) United States Patent
Antoku et al.

(10) Patent No.: US 7,815,369 B2
(45) Date of Patent: Oct. 19, 2010

(54) METHOD OF MEASURING TEMPERATURE OF TUNNEL MAGNETORESISTIVE EFFECT ELEMENT

(75) Inventors: Yosuke Antoku, Tokyo (JP); Eric Leung, Hong Kong (CN); Luke Chung, Hong Kong (CN); Man Tse, Hong Kong (CN)

(73) Assignee: TDK Corporation, Tokyo (JP)

( * ) Notice: Subject to any disclaimer, the term of this patent is extended or adjusted under 35 U.S.C. 154(b) by 448 days.

(21) Appl. No.: 12/034,176

(22) Filed: Feb. 20, 2008

(65) Prior Publication Data

US 2009/0207884 A1 Aug. 20, 2009

(51) Int. Cl.
- *G01K 7/36* (2006.01)
- *G01K 7/01* (2006.01)
- *G11B 5/00* (2006.01)
- *G01R 31/02* (2006.01)

(52) U.S. Cl. .................. 374/163; 374/178; 324/760; 324/252; 428/811; 29/603.09; 360/313

(58) Field of Classification Search .................. 374/178, 374/43–45, 4, 57, 10, 141; 324/760, 527, 324/525, 210, 207.21; 428/811; 29/603.09; 360/313, 324.2

See application file for complete search history.

(56) References Cited

U.S. PATENT DOCUMENTS

| | | | |
|---|---|---|---|
| 6,529,353 B2 * | 3/2003 | Shimazawa | 360/324.2 |
| 7,317,597 B2 * | 1/2008 | Naka | 360/324.2 |
| 7,369,376 B2 * | 5/2008 | Guo et al. | 360/324.2 |
| 7,417,442 B2 * | 8/2008 | Hachisuka et al. | 324/691 |
| 7,635,654 B2 * | 12/2009 | Sun et al. | 438/768 |
| 7,667,456 B2 * | 2/2010 | Naka | 324/210 |
| 2009/0289626 A1 * | 11/2009 | Iben | 324/252 |
| 2009/0323228 A1 * | 12/2009 | Carey et al. | 360/319 |

FOREIGN PATENT DOCUMENTS

| JP | A 2004-185676 | 7/2004 |
|---|---|---|
| JP | A 2005-158195 | 6/2005 |
| JP | A 2006-134905 | 5/2006 |

* cited by examiner

*Primary Examiner*—Gail Verbitsky
(74) *Attorney, Agent, or Firm*—Oliff & Berridge, PLC

(57) ABSTRACT

A method of measuring temperature of a TMR element includes a step of obtaining in advance a temperature coefficient of element resistance of a discrete TMR element that is not mounted on an apparatus, by measuring temperature versus element resistance value characteristic of the discrete TMR element in a state that a breakdown voltage is intentionally applied to the discrete TMR element and a tunnel barrier layer of the discrete TMR element is brought into a stable conductive state, a step of bringing a tunnel barrier layer of a TMR element actually mounted on the apparatus into a stable conductive state by intentionally applying the breakdown voltage to the mounted TMR element having the same structure as that of the discrete TMR element whose temperature coefficient has been measured, a step of measuring an element resistance value of the mounted TMR element with the tunnel barrier layer that has been brought into a stable conductive state, and a step of obtaining a temperature corresponding to the measured element resistance value from the previously measured temperature coefficient of element resistance.

14 Claims, 8 Drawing Sheets

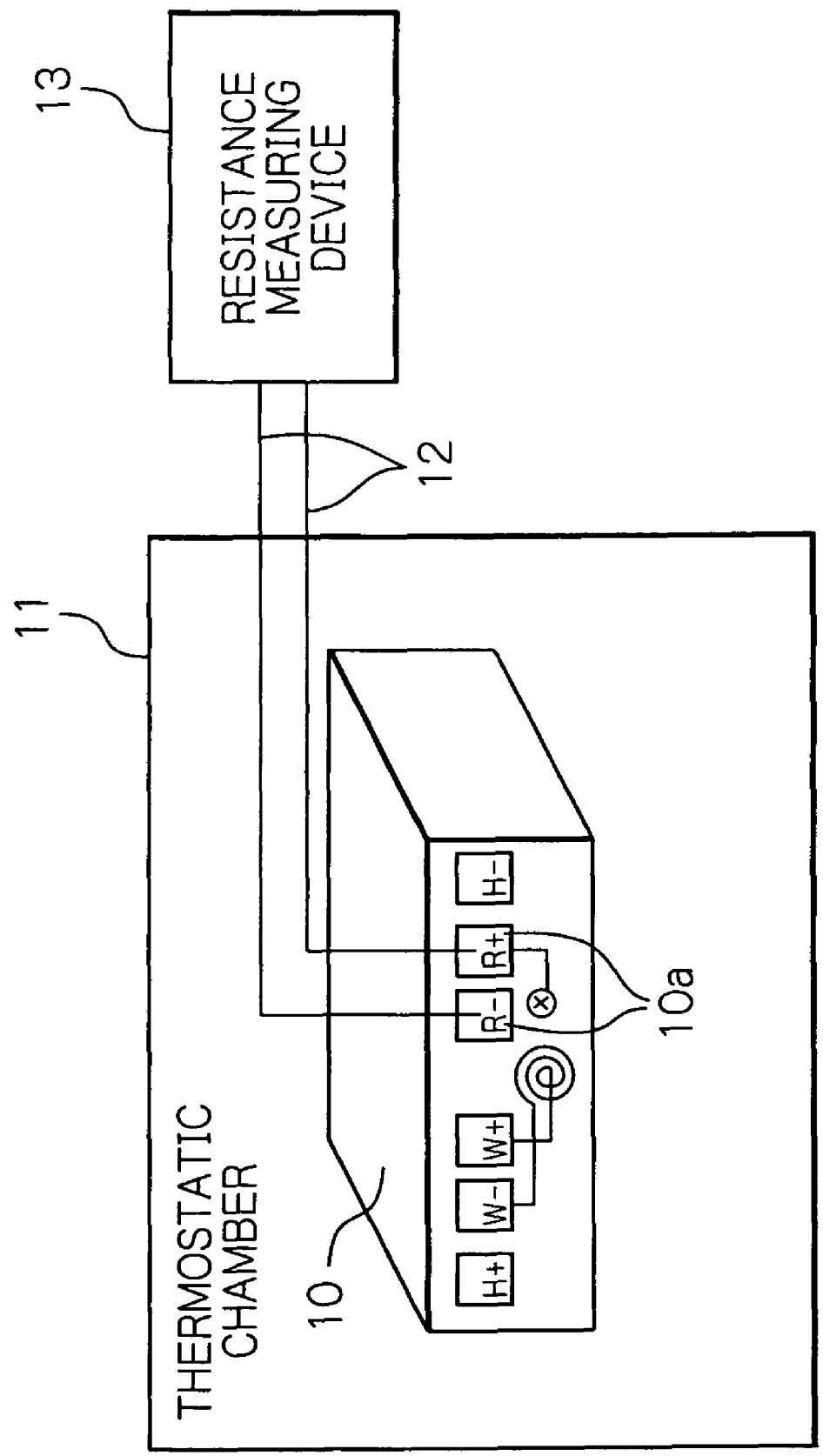

METHOD OF MEASURING TEMPERATURE OF TUNNEL MAGNETORESISTIVE EFFECT ELEMENT

BACKGROUND OF THE INVENTION

1. Field of the Invention

The present invention relates to a method of measuring temperature of a tunnel magnetoresistive effect (TMR) element used as, for example, a read head element of a thin-film magnetic head.

2. Description of the Related Art

In a thin-film magnetic head provided with a TMR read head element, it is sometimes requested to evaluate the temperature of the TMR read head element in a state that the head is actually mounted on an apparatus. For instance, the temperature of the TMR read head element is affected by environmental temperature, generation of heat due to a heater provided inside, generation of heat due to write current flowing through a write head element, and a cooling effect due to air flow caused by flying above a surface of a rotating magnetic disk, and therefore the actual temperature of the TMR read head element cannot be evaluated unless the head is actually mounted on a magnetic disk drive apparatus such as a hard disk drive (HDD) apparatus and the magnetic disk is rotated. Particularly, the cooling effect due to air flow caused by flying above the magnetic disk surface is remarkably affected by, for example, the shape of an air bearing surface (ABS) of the thin-film magnetic head, and therefore accurate temperature cannot be detected unless the head is actually mounted on the HDD apparatus with the magnetic disk rotated so as to be flied.

As a typical technique for detecting the temperature of a read head element in a state that the thin-film magnetic head is actually mounted on an HDD apparatus, there has been a method of detecting the temperature by utilizing temperature dependency of element resistance of the read head element. In this method, temperature coefficient of the element resistance is obtained in advance, and the element temperature is obtained using the temperature coefficient based on the actually obtained element resistance.

However, a problem arises when applying this method to TMR read head elements, while this method is effective in usual anisotropic magnetoresistive effect (AMR) read head elements, and giant magnetoresistive effect (GMR) read head elements. That is, as is well known, the TMR read head element has a tunnel barrier layer that is an electrically insulating layer, and temperature coefficient of the element resistance is very small. Therefore, it has been difficult to obtain the element temperature from the temperature coefficient by measuring the element resistance of the TMR read head element, and further the temperature has not been detected accurately even when it is obtained.

SUMMARY OF THE INVENTION

It is therefore an object of the present invention to provide a method of measuring temperature of a TMR element capable of obtaining accurately with high precision a temperature of a TMR element in a state of being actually mounted on an apparatus.

According to the present invention, a method of measuring temperature of a TMR element includes a step of obtaining in advance a temperature coefficient of element resistance of a discrete TMR element that is not mounted on an apparatus, by measuring temperature versus element resistance value characteristic of the discrete TMR element in a state that a breakdown voltage is intentionally applied to the discrete TMR element and a tunnel barrier layer of the discrete TMR element is brought into a stable conductive state, a step of bringing a tunnel barrier layer of a TMR element actually mounted on the apparatus into a stable conductive state by intentionally applying the breakdown voltage to the mounted TMR element having the same structure as that of the discrete TMR element whose temperature coefficient has been measured, a step of measuring an element resistance value of the mounted TMR element with the tunnel barrier layer that has been brought into a stable conductive state, and a step of obtaining a temperature corresponding to the measured element resistance value from the previously measured temperature coefficient of element resistance.

The method according to the present invention does not include obtaining the element resistance of a TMR element when the tunnel barrier layer is in a normal state, but includes applying a breakdown voltage to the element so that the tunnel barrier layer is brought into a stable conductive state, measuring an element resistance value of a TMR element in the state of being mounted, and obtaining the temperature of the TMR element based on a previously obtained temperature coefficient of the element resistance. By bringing the tunnel barrier layer into a stable conductive state, the element resistance becomes small and the temperature coefficient becomes large, and therefore the temperature can be obtained accurately with high precision and very easily even for the TMR element in the state of being actually mounted on the apparatus.

It is preferred that the step of obtaining the temperature coefficient includes measuring an element resistance of a discrete TMR element that is not mounted on an apparatus, while the temperature of a thin-film magnetic head with the discrete TMR element is varied. In this case, preferably, the step of measuring the element resistance includes placing the thin-film magnetic head into a thermostatic chamber to vary the temperature.

It is also preferred that the breakdown voltage is in a range of 300-700 mV.

It is further preferred that the mounted TMR element having the same structure as that of the discrete TMR element whose temperature coefficient has been measured is a TMR element having the same film composition and the same air-bearing-surface structure as these of the discrete TMR element whose temperature coefficient has been measured.

It is still further preferred that the tunnel barrier layer is composed of oxide of magnesium (Mg), aluminum (Al), titanium (Ti) or zinc (Zn).

According to the present invention, also, a method of measuring temperature of a TMR element includes a step of bringing a tunnel barrier layer of at least one discrete sample of TMR element that is not mounted on an apparatus and is selected out of mass-produced TMR elements having the same structure to each other, into a stable conductive state by intentionally applying a breakdown voltage to the at least one discrete sample, a step of obtaining in advance a temperature coefficient of element resistance of the at least one discrete sample of TMR element, by measuring temperature versus element resistance value characteristic of the at least one discrete sample of TMR element whose tunnel barrier layer has been brought into a stable conductive state, a step of bringing a tunnel barrier layer of a TMR element that is one of the mass-produced magnetoresistive effect elements having the same structure to each other and is actually mounted on the apparatus, into a stable conductive state by intentionally applying the breakdown voltage to the mounted TMR element, a step of measuring an element resistance value of the mounted TMR element with the tunnel barrier layer that has been brought into a stable conductive state, and a step of obtaining a temperature corresponding to the measured element resistance value from the previously measured temperature coefficient of element resistance.

The method according to the present invention does not include obtaining the element resistance of a TMR element when the tunnel barrier layer is in a normal state, but includes extracting at least one discrete sample out of mass-produced TMR elements having the same structure to each other, obtaining in advance temperature coefficient of element resistance of the discrete sample in a stable conductive state of the tunnel barrier layer by applying a breakdown voltage to the sample, applying a breakdown voltage to a mass-produced TMR element having the same structure as of the discrete sample but being mounted on an apparatus to be brought into a stable conductive state, measuring an element resistance value of the mass-produced TMR element in this state, and obtaining the temperature of the TMR element based on a previously obtained temperature coefficient. By bringing the tunnel barrier layer into a stable conductive state, the element resistance becomes small and the temperature coefficient becomes large, and therefore the temperature can be obtained accurately with high precision and very easily even for the TMR element in the state of being actually mounted on the apparatus.

It is preferred that the step of obtaining the temperature coefficient includes measuring an element resistance of a discrete TMR element that is not mounted on an apparatus, while the temperature of a thin-film magnetic head with the discrete TMR element is varied. In this case, preferably, the step of measuring the element resistance includes placing the thin-film magnetic head into a thermostatic chamber to vary the temperature.

It is also preferred that the breakdown voltage is in a range of 300-700 mV.

It is further preferred that the at least one discrete sample of TMR element is a single discrete sample of TMR element.

It is still further preferred that the discrete at least one sample of TMR element is a plurality of discrete samples of TMR elements, and that the step of obtaining in advance a temperature coefficient of element resistance of the at least one discrete sample of TMR element includes measuring respectively temperature versus element resistance value characteristics of the plurality of discrete samples of TMR elements whose respective tunnel barrier layers have been brought into the stable conductive states, and calculating a mean value of the plurality of temperature coefficients obtained by the measurement.

It is further preferred that the mass-produced TMR elements having the same structure to each other are mass-produced TMR elements having the same film composition and the same air-bearing-surface structure to each other.

It is further preferred that the tunnel barrier layer is composed of oxide of Mg, Al, Ti or Zn.

Further objects and advantages of the present invention will be apparent from the following description of the preferred embodiments of the invention as illustrated in the accompanying drawings.

BRIEF DESCRIPTION OF THE DRAWINGS

FIG. 2 is a block diagram schematically illustrating a configuration of an arrangement for measuring temperature coefficient of element resistance of the TMR read head element;

DESCRIPTION OF THE PREFERRED EMBODIMENTS

Figure 1:
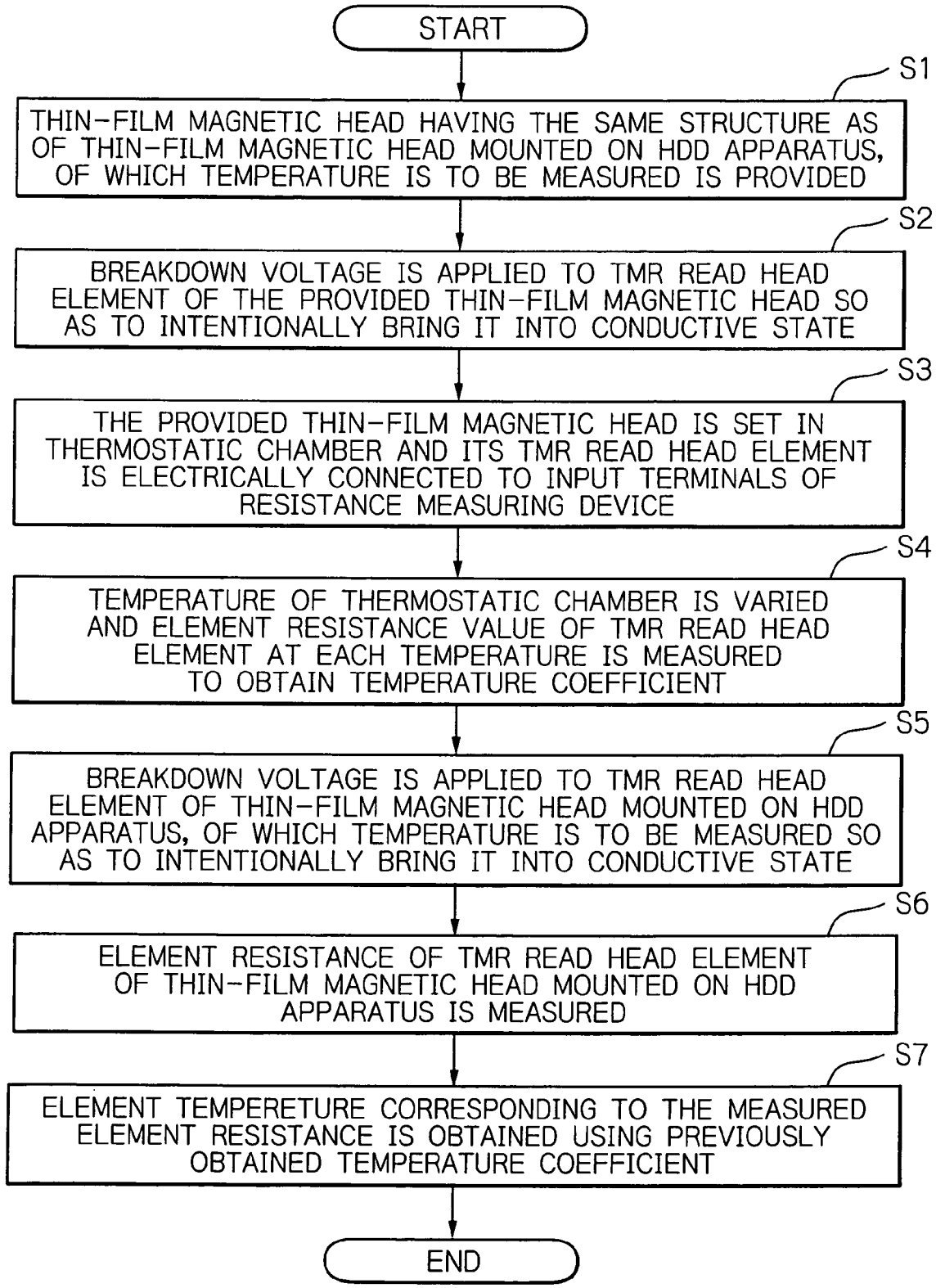
FIG. 1 is a flowchart schematically illustrating a process flow in a method of measuring a temperature of a TMR read head element as an embodiment of the present invention.
Figure 3A:
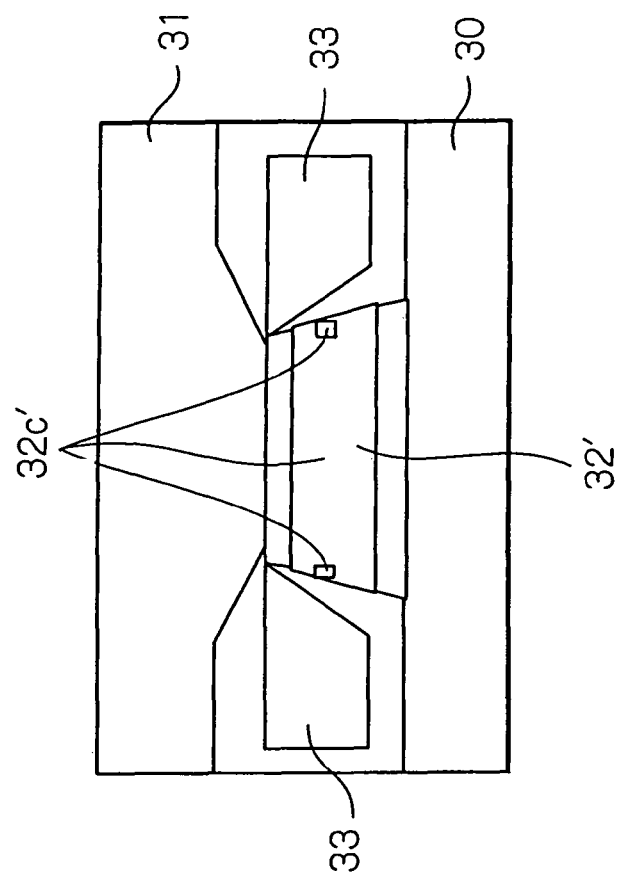
FIGS. 3a and 3b are sectional views schematically illustrating layer structures of the TMR read head elements when the head is in a normal state and when a breakdown voltage is applied to be brought into a conductive state, respectively.
Figure 3B:
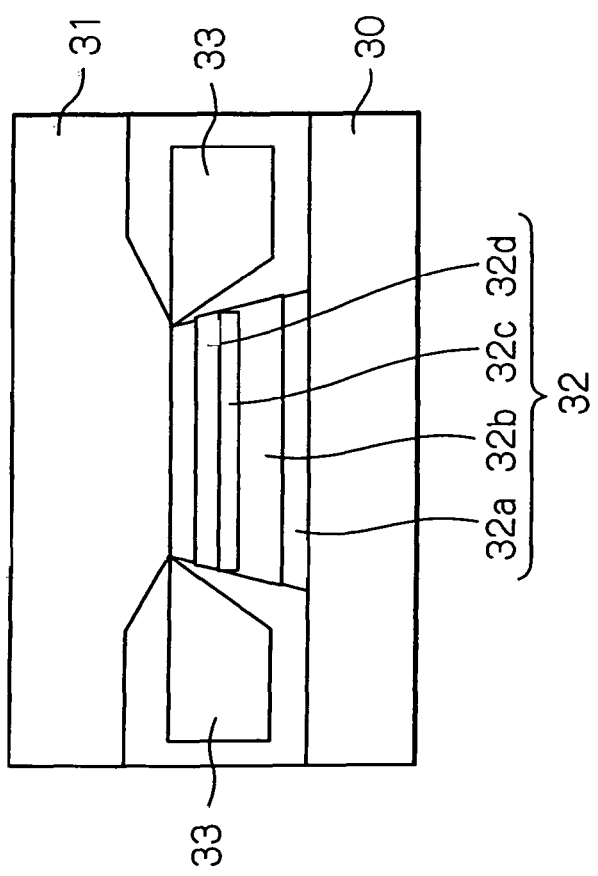
Figure 4:
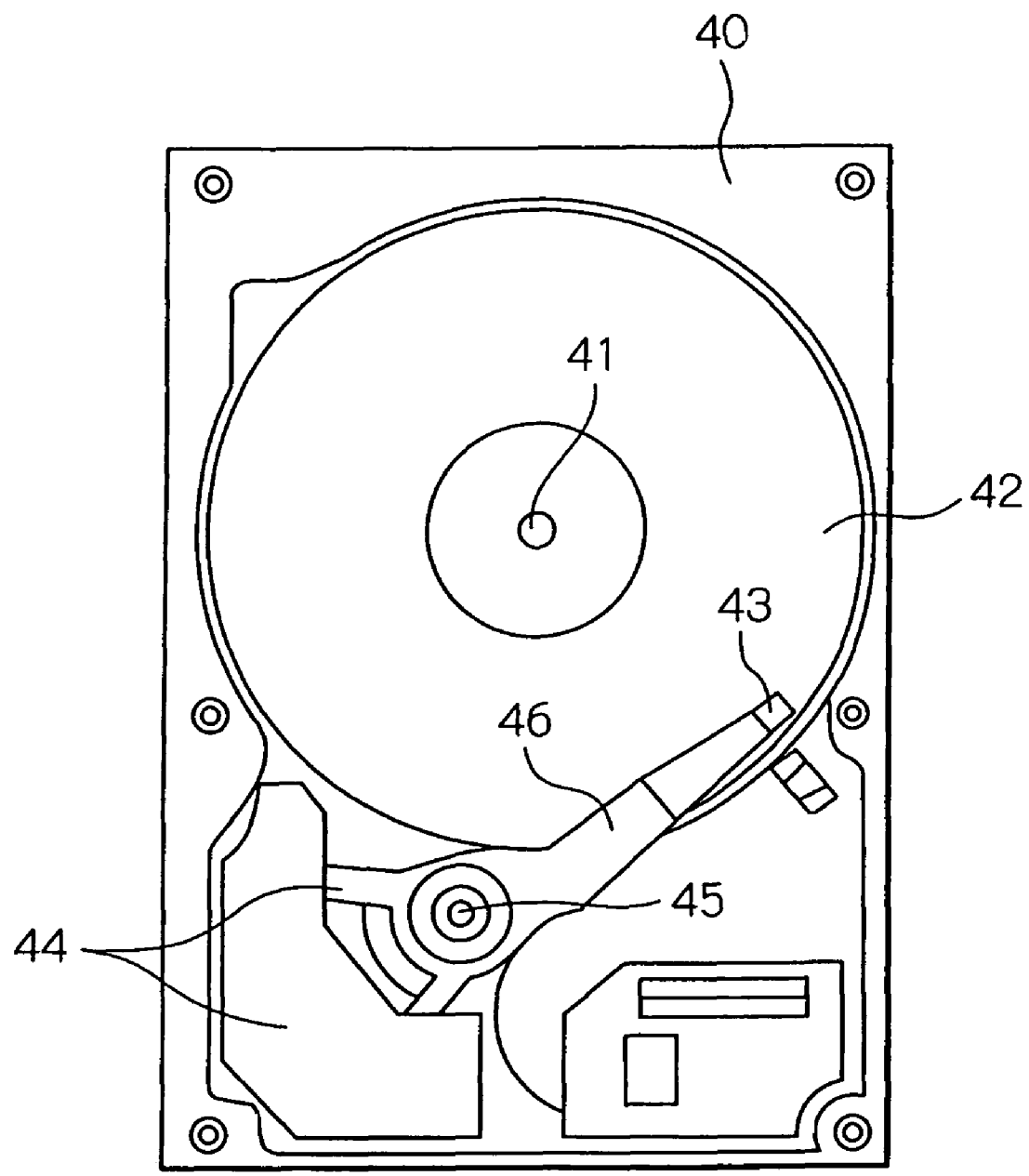
FIG. 4 is a plan view schematically illustrating an entire configuration of an HDD apparatus on which a thin-film magnetic head having a TMR read head element is mounted.
Figure 5:
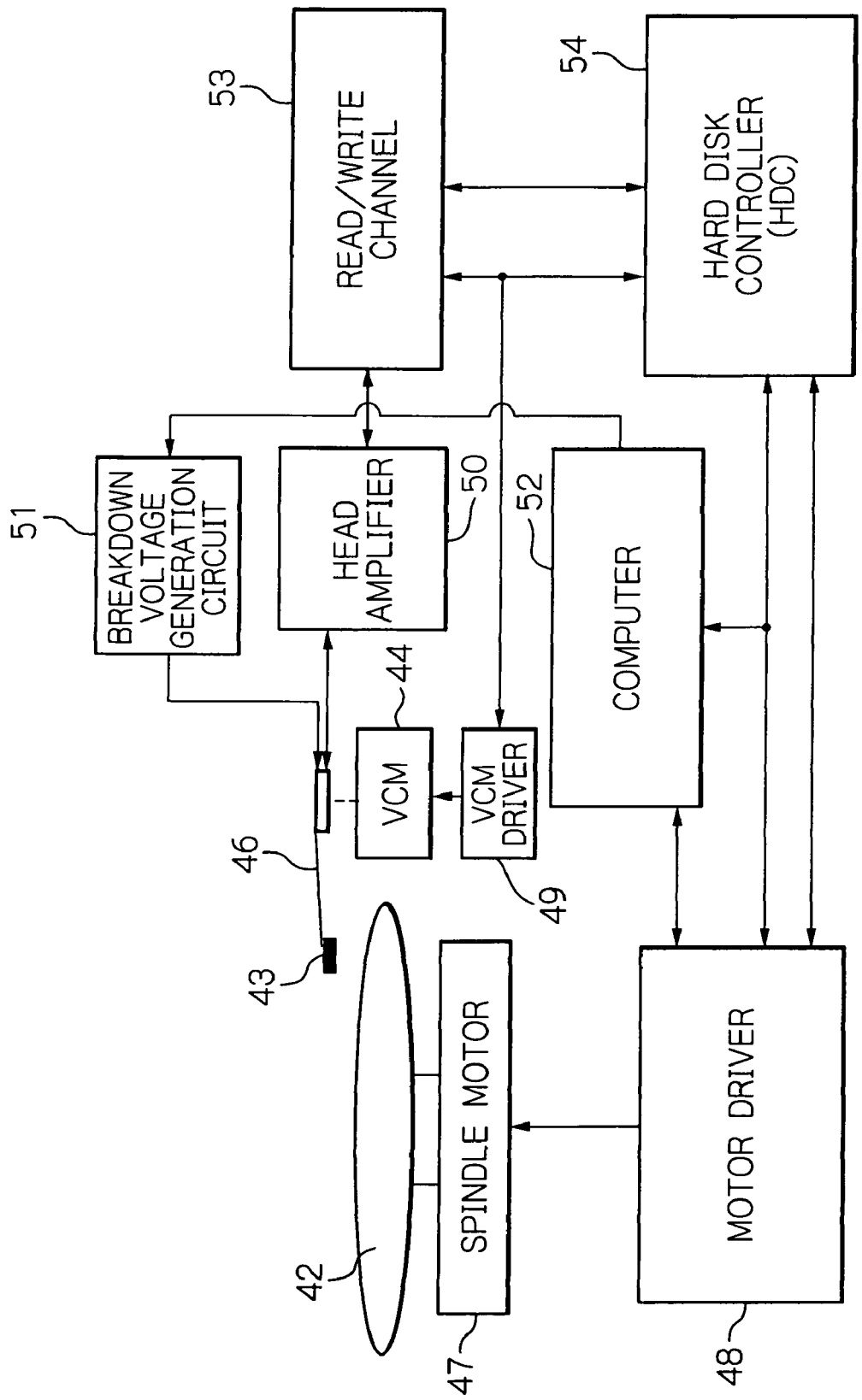
FIG. 5 is a block diagram schematically illustrating an electrical configuration of the HDD apparatus shown in FIG. 4.

FIG. 1 schematically illustrates a process flow in a method of measuring a temperature of a TMR read head element as an embodiment of the present invention, FIG. 2 schematically illustrates a configuration of an arrangement for measuring temperature coefficient of element resistance of the TMR read head element, FIGS. 3a and 3b schematically illustrate layer structures of the TMR read head elements when the head is in a normal state and when a breakdown voltage is applied to be brought into a conductive state, respectively, FIG. 4 schematically illustrates an entire configuration of an HDD apparatus on which a thin-film magnetic head having a TMR read head element is mounted, and FIG. 5 schematically illustrates an electrical configuration of the HDD apparatus shown in FIG. 4. Hereinafter, with reference to these figures, a temperature measurement method in this embodiment will be described.

First, a discrete thin-film magnetic head with a TMR read head element, which is not mounted on an apparatus, is prepared as a sample 10 (Step S1). This thin-film magnetic head sample 10 should have the same structure as of a thin-film magnetic head (magnetic head slider) mounted on an HDD apparatus and provide with a TMR read head element of which temperature is to be measured. Concretely, one or more discrete thin-film magnetic head samples (TMR read head element samples) are prepared out of a group of mass-produced thin-film magnetic heads each having the same structure as of the thin-film magnetic head with the TMR read head element of which temperature is to be measured. The same structure in this case means that the heads have, for example, the same film composition and the same ABS structure.

Each TMR read head element has, as shown in FIG. 3a, a structure such that a TMR multi-layered structure 32 is sandwiched between a lower shield layer (lower electrode layer)

30 and an upper shield layer (upper electrode layer) 31. In FIG. 3a, reference numeral 33 indicates a bias layer for magnetic domain control.

The TMR multi-layered structure 32 in this embodiment includes from the lower shield layer 30 side, for example, a buffer layer, an anti-ferromagnetic layer 32a, a pinned layer 32b, a tunnel barrier layer 32c, and a free layer 32d. The buffer layer has a two-layered structure of a tantalum (Ta) film with a thickness of about 1 nm and a ruthenium (Ru) film with a thickness of about 2 nm. The anti-ferromagnetic layer 32a is composed of an iridium-manganese (IrMn) film with a thickness of about 7 nm. The pinned layer 32b has a four-layered structure of a 70 cobalt-iron (70CoFe) film with a thickness of about 3 nm, a Ru film with a thickness of about 0.8 nm, a cobalt-iron-boron (CoFeB) film with a thickness of about 1.8 nm, and a 90CoFe film with a thickness of about 1 nm. The tunnel barrier layer 32c is composed of a magnesium oxide (MgOx) film with a thickness of about 1 nm. The free layer 32d has a three-layered structure of a 30CoFe film with a thickness of about 0.6 nm, a 90CoFeB film with a thickness of about 0.4 nm, and a 90 nickel-iron (90NiFe) film with a thickness of about 4 nm.

In a modified embodiment, the TMR multi-layered structure may include from the lower shield layer side, for example, a buffer layer having a two-layered structure of a Ta film with a thickness of about 1 nm and a Ru film with a thickness of about 2 nm, an anti-ferromagnetic layer composed of an IrMn film with a thickness of about 7 nm, a pinned layer having a four-layered structure of a 70CoFe film with a thickness of about 3 nm, a Ru film with a thickness of about 0.8 nm, a CoFeB film with a thickness of about 2.4 nm, and a 90CoFe film with a thickness of about 0.6 nm, a tunnel barrier layer composed of an aluminum oxide ($Al_2Ox$) film with a thickness of about 0.475 nm, and a free layer having a four-layered structure of a 30CoFe film with a thickness of about 1 nm, a 90NiFe film with a thickness of about 5 nm, a Ru film with a thickness of about 1 nm, and a Ta film with a thickness of about 5 nm.

In another modification, the tunnel barrier layer may be made of titanium oxide (TiOx) or zinc oxide (ZnOx).

Then, a breakdown voltage higher than a normal bias voltage is applied to TMR read head elements of one or more discrete thin-film magnetic head samples 10, which intentionally makes pinholes in each tunnel barrier layer 32c to be brought into a stable conductive state (Step S2). That is, by applying a breakdown voltage to the head, many pinholes are generated in its tunnel barrier layer as shown in FIG. 3b, to form a tunnel barrier layer 32' having metallic conductive paths.

Figure 6:
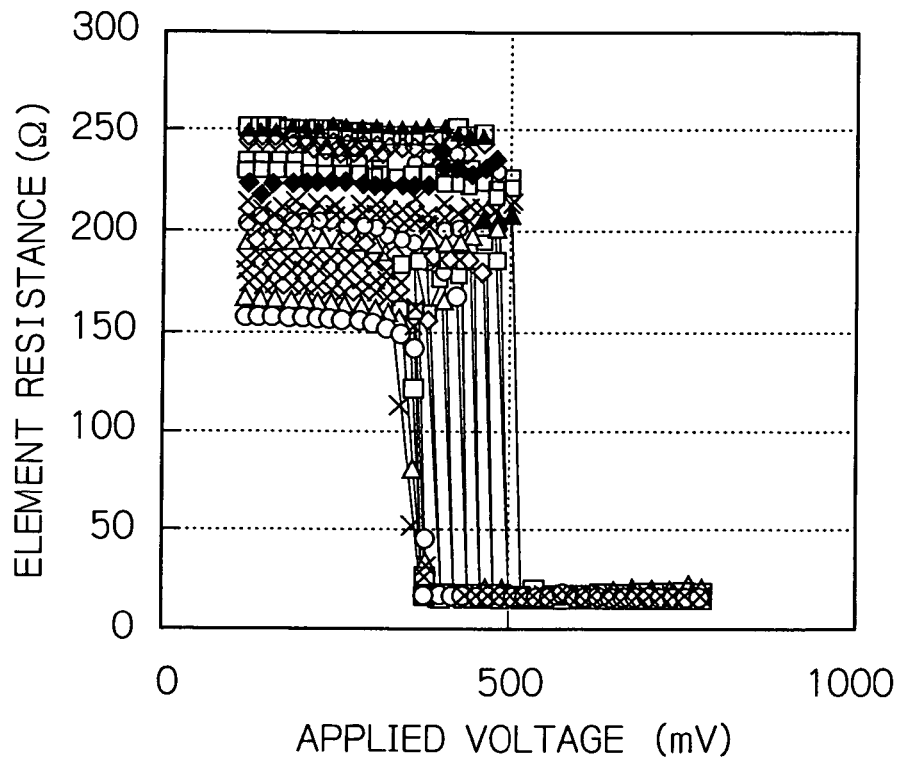
FIG. 6 is a graph illustrating applied voltage versus element resistance characteristic for many TMR read head elements when a tunnel barrier layer is made of MgOx.
Figure 7:
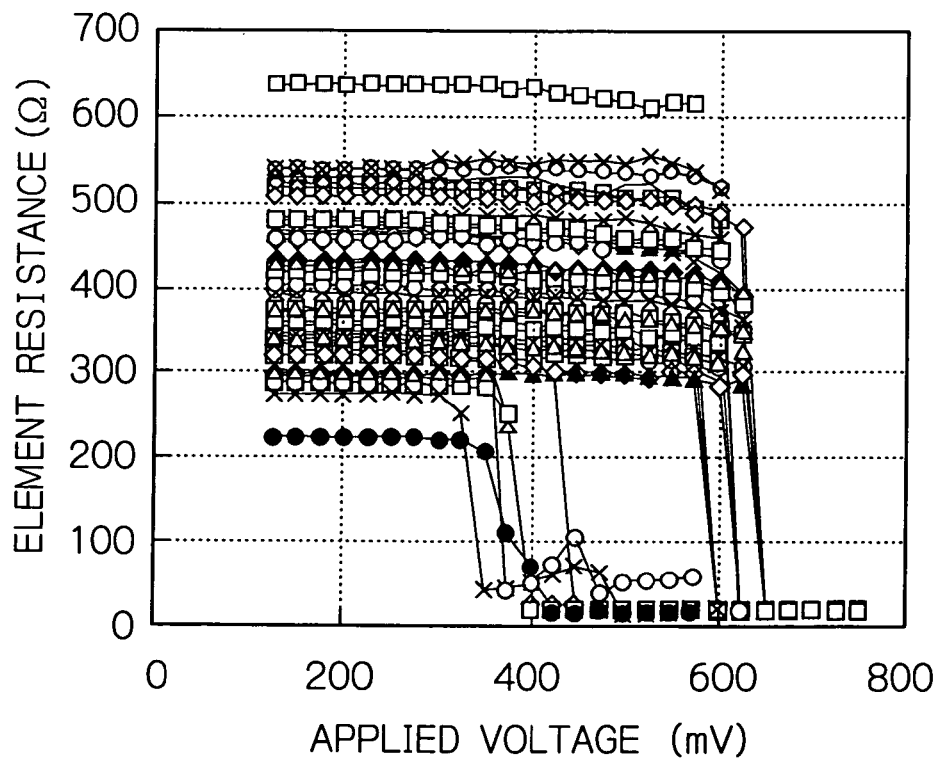
FIG. 7 is a graph illustrating applied voltage versus element resistance characteristic for many TMR read head elements when a tunnel barrier layer is made of $Al_2Ox$.

As shown in FIG. 6, in a case that the tunnel barrier layer is composed of MgOx as in this embodiment, when the applied voltage reaches 300-600 mV, the element resistance of the TMR read head element is reduced abruptly to be brought into a stable conductive state. Accordingly, the breakdown voltage is defined as 300-600 mV in this case. As shown in FIG. 7, when the tunnel barrier layer is composed of $Al_2Ox$, the breakdown voltage is defined as 300-700 mV.

Then, as shown in FIG. 2, each discrete thin-film magnetic head sample 10 is placed into a thermostatic chamber 11, and read-out electrode pads 10a connected to the TMR read head element are electrically connected to input terminals of a resistance measuring device 13 through lead wires 12 (Step S3).

Figure 8:
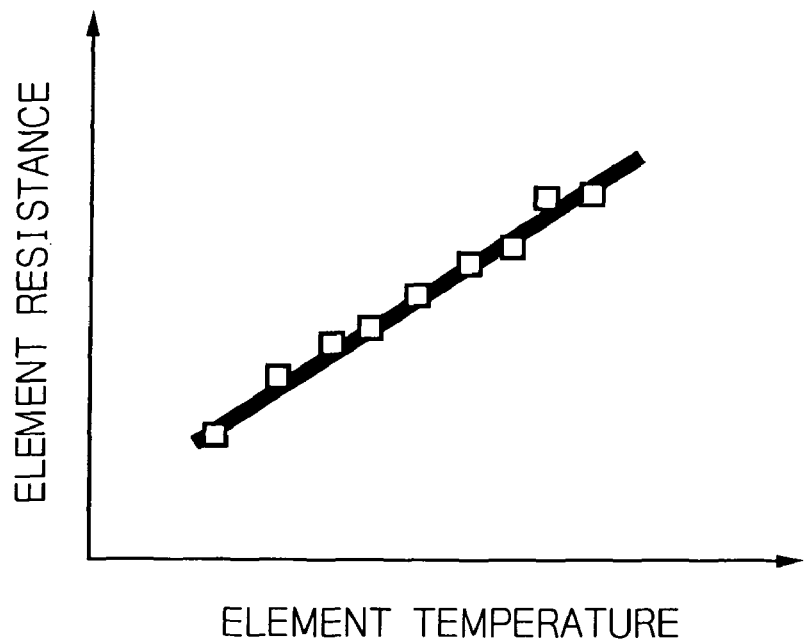
FIG. 8 is a view illustrating temperature coefficient of element resistance that represents relationship between element resistance and element temperature of the TMR read head element.
Figure 9:
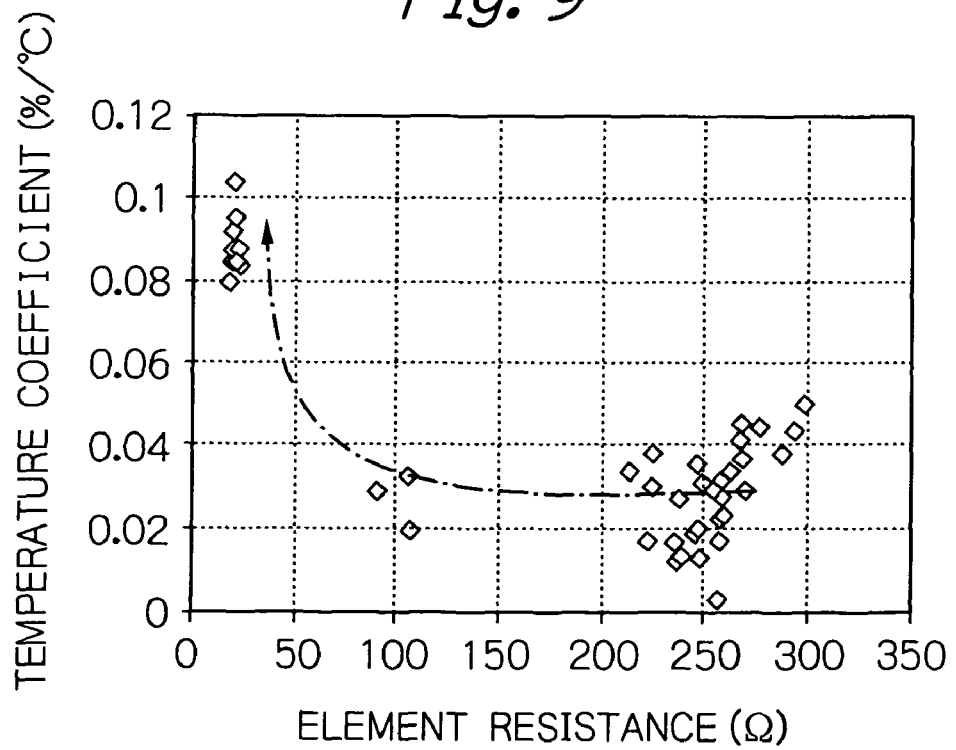
FIG. 9 is a graph illustrating the relationship between element resistance and temperature coefficient of the TMR read head element.

Then, temperature in the thermostatic chamber 11 is changed as 20° C., 25° C., 30° C., 35° C., . . . , and an element resistance value of the TMR read head element is measured at each temperature using the resistance measuring device 13 (Step S4). According to this measurement, as shown in FIG. 8, a relationship between the element temperature and the element resistance value of the TMR read head element of the thin-film magnetic head sample, namely, a temperature coefficient of the element resistance is obtained. The temperature coefficient is obtained from a table or a numerical formula as in the relationship between the element temperature and the element resistance value as shown in FIG. 8, and stored. Particularly in this embodiment, because the tunnel barrier layer of the TMR read head element is intentionally processed so as to generate pinholes to get a stable conductive state, the element resistance becomes small and accordingly the temperature coefficient becomes large as shown in FIG. 9. In case of a single sample 10, the obtained temperature coefficient is defined as the temperature coefficient of a group of mass-produced thin-film magnetic heads having the same structure as of the sample. On the other hand, in case of a plurality of samples 10, a mean value of the obtained temperature coefficients is defined as the temperature coefficient of a group of mass-produced thin-film magnetic heads having the same structure as of the samples.

Incidentally, the temperature coefficient of element resistance of the TMR read head element may be obtained automatically by controlling the thermostatic chamber 11 and the resistance measuring device 13 with use of a computer. It is apparent that there may be used any other equipment which can selectively control and maintain the temperature of a thin-film magnetic head to a desired temperature instead of the thermostatic chamber.

On the other hand, a breakdown voltage higher than a normal bias voltage is applied to a TMR read element of a thin-film magnetic head mounted on the HDD apparatus, of which temperature is actually to be measured, and pinholes are intentionally generated in the tunnel barrier layer to be brought into a stable conductive state (Step S5). This thin-film magnetic head is one of a group of mass-produced thin-film magnetic heads having the same structure as of the sample.

As shown in FIG. 4, the HDD apparatus, as a mechanical configuration, has within a housing 40 a magnetic disk 42 and a head arm assembly 46. The magnetic disk 42 is rotatably driven around an axis 41 by a spindle motor. The head arm assembly 46 has a thin-film magnetic head 43 mounted at a top end section of this assembly, and a coil part of a voice coil motor (VCM) 44 mounted at a back end section of this assembly. The assembly 46 is supported to swing around a horizontal rotation axis 45 in parallel with a surface of the disk 42.

As shown in FIG. 5, the HDD apparatus, as an electrical configuration, has mainly a spindle motor 47 for rotationally driving the magnetic disk 42, a motor driver 48 for the spindle motor 47, a VCM driver 49 for the VCM 44, a head amplifier 50 for the thin-film magnetic head 43, a breakdown voltage generation circuit 51 for generating a breakdown voltage to be applied to the TMR read head element of the thin-film magnetic head 43, and a hard disk controller (HDC) 54 for controlling the motor driver 48, the VCM driver 49 and the head amplifier 50 through a read/write channel 53 according to the control of a computer 52.

The thin-film magnetic head 43 has completely the same structure as of the head sample 10 whose temperature coefficient has been measured using the thermostatic chamber 11.

After the TMR read head element of the thin-film magnetic head 43 has been brought into the stable conductive state at Step 5 as described above, the element resistance is measured while the HDD apparatus is in operation, that is, in the state that the thin-film magnetic head flies above the surface of the disk rotated (Step S6). The element resistance can be easily obtained from the voltage applied to the TMR read head element from the head amplifier 50 and the current flowing through the TMR read head element.

Thereafter, an element temperature corresponding to the measured element resistance is obtained using the table or the numerical formula for the temperature coefficient of the previously measured element resistance (Step S7).

In this embodiment, since the tunnel barrier layer is particularly brought into a stable conductive state with application of a breakdown voltage, the element resistance becomes small and accordingly the temperature coefficient becomes large, so that the element temperature can be obtained accurately. That is, according to this embodiment, the temperature can be obtained accurately with high precision and very easily even for the TMR read head element in the state of being actually mounted on the HDD apparatus.

Figure 10A:
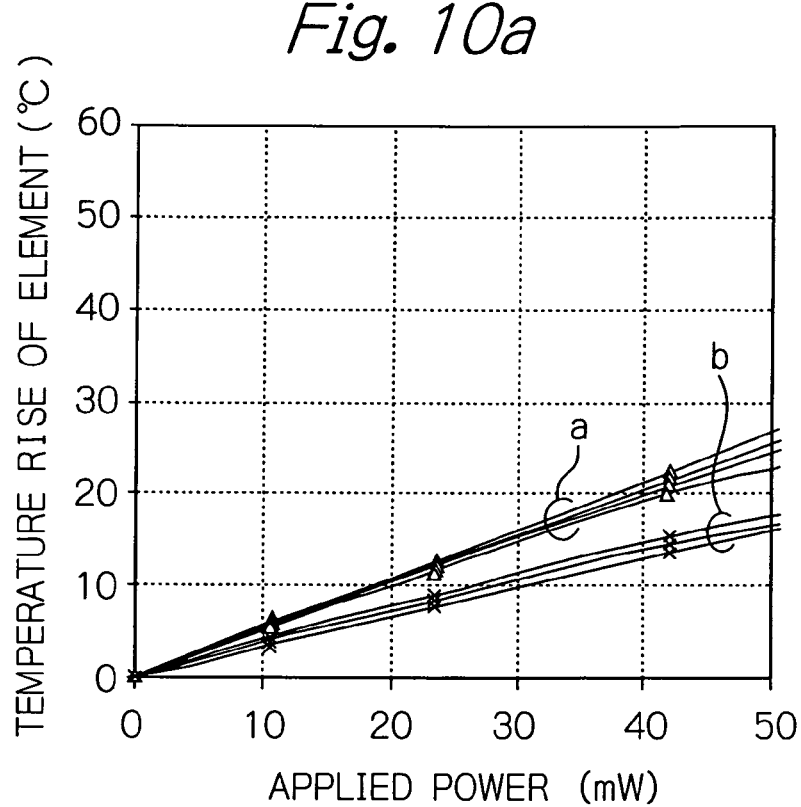
FIGS. 10a and 10b are graphs illustrating temperature rise of measured TMR read head elements in thin-film magnetic heads with heaters for various kinds of structures.
Figure 10B:
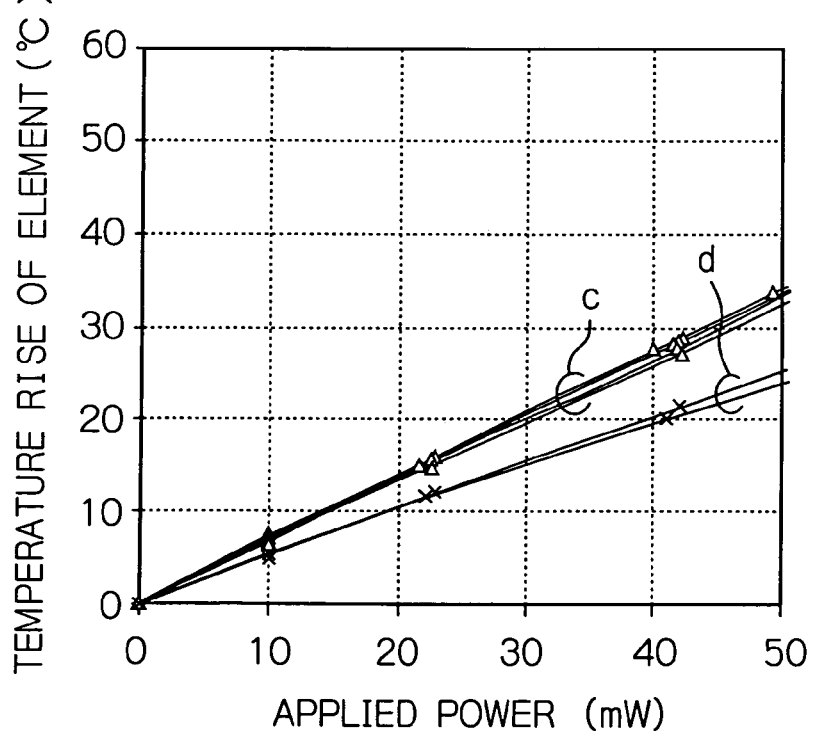

FIGS. 10*a* and 10*b* show temperature rise of TMR read head elements measured according to the method of this embodiment for thin-film magnetic heads of various kinds of structures with respective heaters in the state that each head is actually mounted on an HDD apparatus and its hard disk is rotated. In the figures, the abscissa indicates a power applied to a heater and the ordinate a measured temperature rise of the TMR read head element, and a, b, c and d respectively indicate four groups of mass-produced thin-film magnetic heads having the same structure in each group. That is, the head groups a and b are different from the head group c and d in the film composition, and the head groups a and c are different from the head group b and d in the ABS shape.

As will be noted from these figures, in a group of mass-produced thin-film magnetic heads having the same structure each other, inclination of the temperature rise relative to the applied power, namely, the temperature coefficient becomes almost constant. Accordingly, it will be understood that, as for the group of mass-produced thin-film magnetic heads having the same structure each other, if a temperature coefficient is obtained by selecting at least one sample, the temperature coefficient can substitute for that of the thin-film magnetic heads belonging to the group. Moreover, as explained before, when a thin-film magnetic head is actually mounted on an HDD apparatus and the magnetic disk is rotated to fly the thin-film magnetic head, the cooling effect due to the air flow is greatly affected by the ABS shape. As shown in FIGS. 10*a* and 10*b*, according to the temperature measuring method of this embodiment, the temperature rise, including the cooling effect due to the air flow, can be measured accurately for groups a, b, c and d of thin-film magnetic heads of various kinds of ABS shapes.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A method of measuring temperature of a tunnel magnetoresistive effect element comprising the steps of:
   obtaining in advance a temperature coefficient of element resistance of a discrete tunnel magnetoresistive effect element that is not mounted on an apparatus, by measuring temperature versus element resistance value characteristic of said discrete tunnel magnetoresistive effect element in a state that a breakdown voltage is intentionally applied to said discrete tunnel magnetoresistive effect element and a tunnel barrier layer of said discrete tunnel magnetoresistive effect element is brought into a stable conductive state;
   bringing a tunnel barrier layer of a tunnel magnetoresistive effect element actually mounted on the apparatus into a stable conductive state by intentionally applying the breakdown voltage to the mounted tunnel magnetoresistive effect element having the same structure as that of said discrete tunnel magnetoresistive effect element whose temperature coefficient has been measured;
   measuring an element resistance value of said mounted tunnel magnetoresistive effect element with said tunnel barrier layer that has been brought into a stable conductive state; and
   obtaining a temperature corresponding to the measured element resistance value from the previously measured temperature coefficient of element resistance.

2. The method as claimed in claim 1, wherein the step of obtaining the temperature coefficient comprises measuring an element resistance of a discrete tunnel magnetoresistive effect element that is not mounted on an apparatus, while the temperature of a thin-film magnetic head with said discrete tunnel magnetoresistive effect element is varied.

3. The method as claimed in claim 2, wherein the step of measuring the element resistance comprises placing said thin-film magnetic head into a thermostatic chamber to vary the temperature.

4. The method as claimed in claim 1, wherein the breakdown voltage is in a range of 300-700 mV.

5. The method as claimed in claim 1, wherein said mounted tunnel magnetoresistive effect element having the same structure as that of said discrete tunnel magnetoresistive effect element whose temperature coefficient has been measured is a tunnel magnetoresistive effect element having the same film composition and the same air-bearing-surface structure as these of said discrete tunnel magnetoresistive effect element whose temperature coefficient has been measured.

6. The method as claimed in claim 1, wherein said tunnel barrier layer is composed of oxide of magnesium, aluminum, titanium or zinc.

7. A method of measuring temperature of a tunnel magnetoresistive effect element comprising the steps of:
   bringing a tunnel barrier layer of at least one discrete sample of tunnel magnetoresistive effect element that is not mounted on an apparatus and is selected out of mass-produced tunnel magnetoresistive effect elements having the same structure to each other, into a stable conductive state by intentionally applying a breakdown voltage to said at least one discrete sample;
   obtaining in advance a temperature coefficient of element resistance of said at least one discrete sample of tunnel magnetoresistive effect element, by measuring temperature versus element resistance value characteristic of said at least one discrete sample of tunnel magnetoresistive effect element whose tunnel barrier layer has been brought into a stable conductive state;
   bringing a tunnel barrier layer of a tunnel magnetoresistive effect element that is one of the mass-produced magnetoresistive effect elements having the same structure to each other and is actually mounted on the apparatus, into a stable conductive state by intentionally applying the breakdown voltage to the mounted tunnel magnetoresistive effect element;
   measuring an element resistance value of said mounted tunnel magnetoresistive effect element with said tunnel barrier layer that has been brought into a stable conductive state; and
   obtaining a temperature corresponding to the measured element resistance value from the previously measured temperature coefficient of element resistance.

8. The method as claimed in claim 7, wherein the step of obtaining the temperature coefficient comprises measuring an element resistance of a discrete tunnel magnetoresistive effect element that is not mounted on an apparatus, while the temperature of a thin-film magnetic head with said discrete tunnel magnetoresistive effect element is varied.

9. The method as claimed in claim 8, wherein the step of measuring the element resistance comprises placing said thin-film magnetic head into a thermostatic chamber to vary the temperature.

10. The method as claimed in claim 7, wherein the breakdown voltage is in a range of 300-700 mV.

11. The method as claimed in claim 7, wherein said at least one discrete sample of tunnel magnetoresistive effect element is a single discrete sample of tunnel magnetoresistive effect element.

12. The method as claimed in claim 7, wherein said discrete at least one sample of tunnel magnetoresistive effect element is a plurality of discrete samples of tunnel magnetoresistive effect elements, and wherein the step of obtaining in advance a temperature coefficient of element resistance of said at least one discrete sample of tunnel magnetoresistive effect element comprises measuring respectively temperature versus element resistance value characteristics of the plurality of discrete samples of tunnel magnetoresistive effect elements whose respective tunnel barrier layers have been brought into the stable conductive states, and calculating a mean value of the plurality of temperature coefficients obtained by the measurement.

13. The method as claimed in claim 7, wherein said mass-produced tunnel magnetoresistive effect elements having the same structure to each other are mass-produced tunnel magnetoresistive effect elements having the same film composition and the same air-bearing-surface structure to each other.

14. The method as claimed in claim 7, wherein the tunnel barrier layer is composed of oxide of magnesium, aluminum, titanium or zinc.

* * * * *

UNITED STATES PATENT AND TRADEMARK OFFICE
CERTIFICATE OF CORRECTION

PATENT NO. : 7,815,369 B2
APPLICATION NO. : 12/034176
DATED : October 19, 2010
INVENTOR(S) : Yosuke Antoku et al.

Page 1 of 1

It is certified that error appears in the above-identified patent and that said Letters Patent is hereby corrected as shown below:

On the title page, item [73] should read

-- (73)   Assignees:   TDK Corporation, Tokyo (JP)
                       SAE Magnetics (H.K.) Ltd., Hong Kong (CN) --

Signed and Sealed this
Twenty-sixth Day of July, 2011

David J. Kappos
*Director of the United States Patent and Trademark Office*